E. UNDERWOOD, Sr.
ILLUMINATING AND HEATING APPARATUS.
No. 175,788. Patented April 4, 1876.
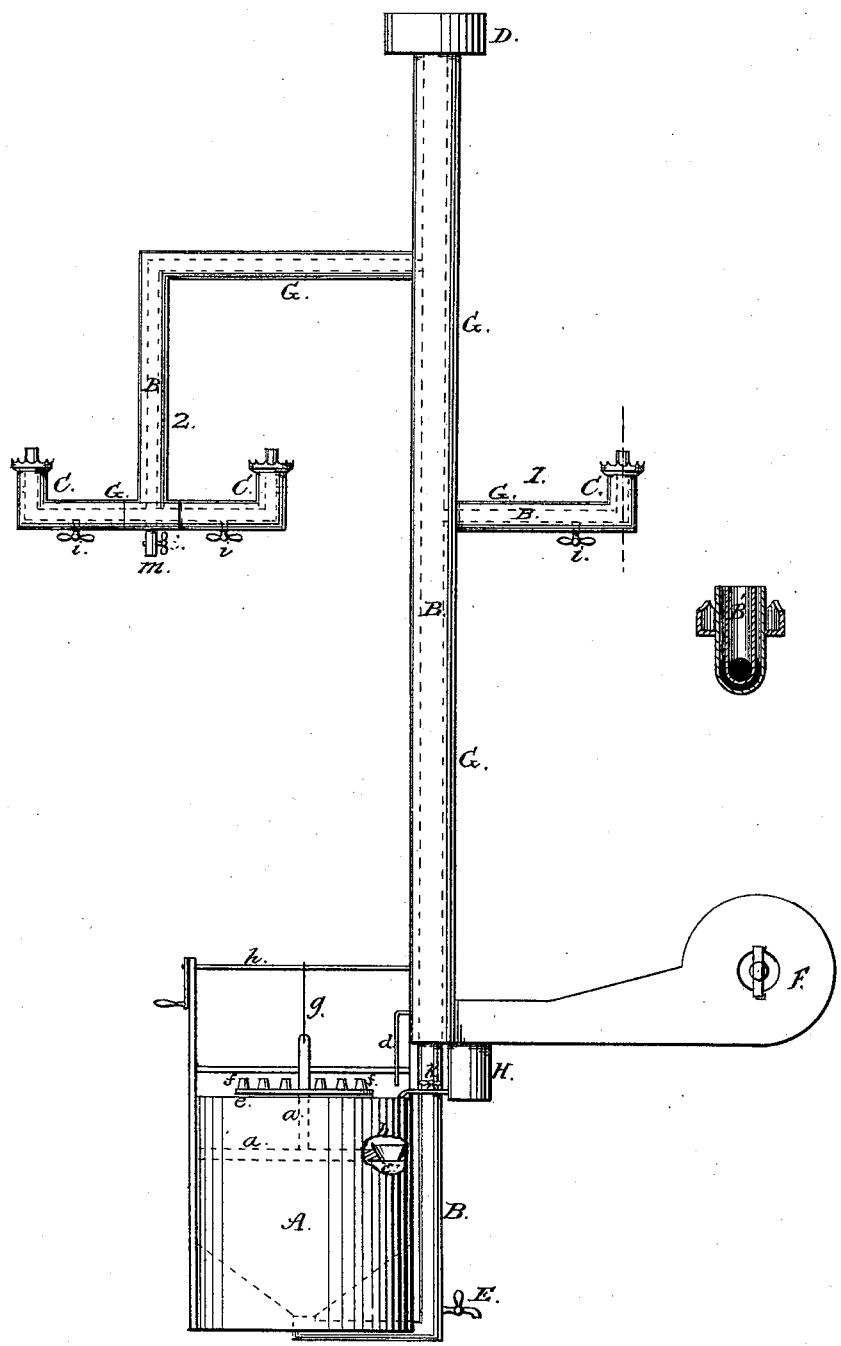
Witnesses:
F. W. Howard
Thomas C. Connoly
Thos. C. Cox
Inventor:
Eugene Underwood

UNITED STATES PATENT OFFICE.

EUGENE UNDERWOOD, SR., OF LOUISVILLE, KENTUCKY.

IMPROVEMENT IN ILLUMINATING AND HEATING APPARATUS.

Specification forming part of Letters Patent No. 175,788, dated April 4, 1876; application filed March 25, 1876.

*To all whom it may concern:*

Be it known that I, EUGENE UNDERWOOD, Sr., of the city of Louisville, in the county of Jefferson and State of Kentucky, have invented a new and useful Improvement in Illuminating and Heating Apparatus, which improvement is fully set forth in the following specification, reference being had to the accompanying drawing.

My invention is designed to supply to flames liquid fuel and air from a stationary reservoir containing oil for the former, and an air-blower, to impel air for the latter, through stationary pipes connected with each. It is designed for use anywhere, and to be applied to any suitable purpose connected with the use of artificial light or heat; also, to furnish a multiplicity of flames at the same time—as, for instance, all the lights of any public or private building, or of a street or city—from the same source.

There are other inventions having, to some extent, the same object as mine, and may be classified as, first, those in which the oil flows naturally down through pipes from tanks above; second, those in which the oil is forced up the pipes from tanks below.

The first class are objectionable because of the comparative inconvenience and danger from the location of the tank being necessarily elevated, and, in most cases, in or about the upper portions of buildings. The sediment from the oil is more liable to obstruct the pipes and passages to the flames than when supplied from a tank below.

Of the second class, those actuated by water-power are limited to localities where "water-works" are established, to which a tax must be paid for use. The liability of the water to freeze, and other casualties, would render the apparatus dependent thereon less efficacious; and those of the second class actuated by compressed air are objectionable because of the necessity for a separate apparatus to impel the oil, and the lack of uniform pressure, as the power diminishes in proportion to the increase of space occupied by the compressed air; and the air so used is liable to be impregnated with explosive gas from the oil.

I claim that my invention avoids these objections, and has advantages not possessed by any other.

The liquid fuel to be used for the purposes of my invention may be of any kind of oil or other combustible liquid, and which may be impelled through pipes in the manner herein described, and which are herein referred to by the term oil. This and the common air are the materials to be used.

I purpose to use, when necessary, any form of lamp burner or wick in public use as an attachment to my invention, or their equivalent; and I claim that kerosene or coal-oil supplied to the lamps from the pipes B, when used as an attachment to my invention, is rendered almost innoxious, as the lamps will be kept continuously full, and no space left open in which explosive gas arising from the oil may accumulate; and, as it may be so readily withdrawn from the pipes B back to tank A, it is rendered comparatively harmless.

In the drawing, A represents a reservoir or tank, of any suitable form and size, supposed to contain oil. *a* is a piston; *b*, aperture through piston-head to supply tank A; *c*, valve, or its equivalent, to close aperture *b* underneath; *d*, pin to open valve *c* when the piston is drawn up; *e*, platform attached to piston-rod *a* to support weights; *f*, weights of any kind; *g*, cord, or its equivalent, connecting piston *a* and windlass *h*, or its equivalent. B is a pipe or system of pipes to convey oil from tank A to the burner at C, (which may be of any sort,) when forced by pressure of weights *f* upon piston *a*, and which will be returned to tank A, upon elevation of piston *a*, by means of cord *g* and windlass *h*. The pipes, near the burner, are arranged as shown in detail at B. D, receptacle to receive overflow from undue pressure upon piston *a*, pipe B being open at this point for the purpose of relief against undue pressure upon piston *a*, as well as to admit, and permit the escape of air; *i*, stop-cocks to regulate the flow of oil; E, cocks to empty tank A and pipes B, when desired.

The tank A being located in a cellar or other safe position, may be used as a safe deposit for the oil, the pipes B being readily discharged therein, as described.

F is an air-blower of any suitable kind; G, an air-pipe, or system of air-pipes, which may be, as shown in the drawing, made to inclose the oil-pipes B or not, to suit circumstances. Air-pipe G is closed tightly around oil-pipe B at D, to prevent escape of air at that point, but open at the end, near the point of contact with the flames at C, and leaving a sufficient space elsewhere between pipes G and B to admit a passage of air from the blower F to the flames at C. Air-pipes G are also designed to catch and receive any overflow or leakage from oil-pipes B, and to convey it back to tank A, being first received into basin H, and from thence emptied into tank A through pipe $k$ and aperture $b$. Where the branch pipes, as shown in Fig. 2, are turned down, so that the leakage or overflow from pipe B into pipe G cannot flow back into tank A, as elsewhere, it must be drawn off through cock $m$.

It will now be seen that by means of the weights $f$ and piston $a$ the oil in tank A is impelled through the pipes B, regulated by stop-cocks $i$, to the flames at C, and that the blower F and air-pipes G supply them with an increase of air, thus furnishing oil and air to a multiplicity of illuminating or heating flames by a system of stationary oil-pipes, B, and stationary air-pipes G, combined together with their respective attachments, the tank A and blower F, in a mode not heretofore used or invented, and which I claim as my invention.

This invention is designed for heating as well as illuminating purposes. Its application thereto will be readily understood from the foregoing description.

I am aware of other inventions designed to distribute oil to flames through stationary pipes, supplied from a stationary reservoir, to produce light or heat, but none of them have combined with them a stationary pipe or system of stationary pipes attached to a stationary blower to supply the flames with an increase of air.

I am aware of other inventions designed to supply isolated lamps not connected nor fed through pipes from a stationary reservoir, with an increase of air from a stationary pipe and blower. But none of them have combined with them a stationary pipe or system of such, and a stationary reservoir to supply the lamp with oil.

I am not aware of any other invention than this, which I claim, whereby a multiplicity of flames giving light and heat are supplied with oil from a stationary reservoir through stationary pipes, in connection and in combination with another system of fixed and stationary pipes attached to an air-blower, by which the flames are supplied with an increase of air.

The various articles used for the purposes of my invention, to wit, the windlass, cord, piston, cylinder or tank, weights, valve, pipes, air-blower, and cocks, are all old, and of common use. The act of conveying air, also oil, through pipes is likewise old, none of which, taken separately or of themselves, do I claim.

In this permanent apparatus, where a large amount of oil must be forced to such height greater than required in any portable apparatus, a spring such as has been used in a movable lamp is impracticable, for the reason that a large spring such as would be required for this purpose would act unequally, giving excess of oil in its first action and too little in its last, an absolutely fatal objection.

I disclaim the idea of a piston moved by a spring, and limit myself to the weighted piston.

What I claim as new, and desire to secure by Letters Patent, is—

1. The weights $f$, in combination with the piston $a$, tank A, and pipes B, to supply oil to the flames C in the mode described, applied to a permanent and stationary apparatus, as described, for the purposes named.

2. The combination of the oil-pipes B, with tank A, piston $a$, weights $f$, cord $g$, and windlass $h$, with the air-pipes G and with air-blower F, applied to a permanent stationary apparatus, for the purposes described.

3. The receptacle D, in combination with the pipe B, having an opening where it is joined to receptacle D, for the purposes described.

4. The inner pipes B′, forming the ends of the branches of the main pipe B, combined with the exterior pipe and leaving an intervening space, the ends of the two pipes being arranged with relation to each other substantially as described, so that any overflow from the inner oil-pipe shall escape in the space between the two and flow back through pipe G to the catch-basin.

5. The air-pipes G, arranged to catch or receive any leakage or overflow of oil from pipes B, and to convey it back to tank A, as described.

6. The catch-basin H, in combination with air-pipe G, pipe $k$, and tank A, to receive and hold the oil that may overflow or leak from the pipes B until emptied into tank A, as described.

7. The tank A and weighted piston, in combination with the oil-pipe and branches, air-pipe, and blower of a stationary apparatus, as and for the purposes set forth.

8. In a stationary apparatus, the oil-pipe arranged within the air-pipe, in combination with the tank and the blower and its forcing apparatus, as set forth.

EUGENE UNDERWOOD, Sr.

Witnesses:
THOMAS C. CONNOLLY,
THOS. C. COX.